US012708909B2

(12) United States Patent
Stapleton et al.

(10) Patent No.: US 12,708,909 B2
(45) Date of Patent: Aug. 18, 2026

(54) APPARATUS FOR DUST MITIGATION

(71) Applicant: Innovative Aerospace LLC, Southwick, MA (US)

(72) Inventors: Thomas J Stapleton, Southwick, MA (US); Lynne Ann Stapleton, Southwick, MA (US)

(*) Notice: Subject to any disclaimer, the term of this patent is extended or adjusted under 35 U.S.C. 154(b) by 520 days.

(21) Appl. No.: 18/173,249

(22) Filed: Feb. 23, 2023

(65) Prior Publication Data

US 2023/0271194 A1 Aug. 31, 2023

Related U.S. Application Data

(60) Provisional application No. 63/314,644, filed on Feb. 28, 2022.

(51) Int. Cl.
*B01D 53/22* (2006.01)
*B03C 1/02* (2006.01)

(52) U.S. Cl.
CPC ............ *B03C 1/02* (2013.01); *B03C 2201/20* (2013.01)

(58) Field of Classification Search
CPC .............................. B03C 1/02; B03C 2201/20
See application file for complete search history.

(56) References Cited

U.S. PATENT DOCUMENTS

| | | | | | |
|---|---|---|---|---|---|
| 6,161,529 | A * | 12/2000 | Burgess | F01M 13/04 | 123/572 |
| 6,338,339 | B1 * | 1/2002 | Tsutsui | B65D 83/48 | 222/402.1 |
| 6,532,835 | B1 * | 3/2003 | Saaski | G01N 1/2273 | 73/863.21 |
| 10,717,031 | B2 * | 7/2020 | Lauden | B01D 46/10 | |
| 2005/0033132 | A1 * | 2/2005 | Shults | C12Q 1/006 | 604/890.1 |
| 2005/0209685 | A1 * | 9/2005 | Shifrin | A61B 17/0644 | 606/108 |
| 2006/0237680 | A1 * | 10/2006 | Denike | B64D 13/04 | 251/305 |
| 2006/0266420 | A1 * | 11/2006 | Lonnes | G05D 16/109 | 137/496 |
| 2008/0223343 | A1 * | 9/2008 | Ammermann | F02M 25/0836 | 123/520 |
| 2009/0116938 | A1 * | 5/2009 | Wakabayashi | F16K 35/00 | 414/217.1 |
| 2021/0370106 | A1 * | 12/2021 | Lorenzen | A62B 23/02 | |
| 2023/0069995 | A1 * | 3/2023 | Bjorkquist | B01D 29/21 | |
| 2025/0326250 | A1 * | 10/2025 | Kemeny | B60B 9/28 | |
| 2025/0367964 | A1 * | 12/2025 | Kemeny | B60B 9/18 | |
| 2025/0367965 | A1 * | 12/2025 | Kemeny | B60B 9/18 | |

* cited by examiner

*Primary Examiner* — Anthony Shumate
(74) *Attorney, Agent, or Firm* — W Scott Keeley; Keeley DeAngelo LLP

(57) ABSTRACT

A dust-mitigation device used in space exploration is a system for protecting the venting components of certain environments from the entry of lunar dust. The system enables ventilation while preventing dust from reaching sealing surfaces of a spacesuit's valves (SPVs).

8 Claims, 8 Drawing Sheets

300

200

APPARATUS FOR DUST MITIGATION

This invention was made with Government support under contract number 80NSSC22CA065 awards by NASA. The government has certain rights in the invention.

TECHNICAL FIELD

The disclosed embodiment is directed to systems in the art of space exploration for removing dust from human environments.

BACKGROUND

Lunar dust has posed a problem to NASA since the Apollo expedition. Unlike dust on earth, lunar dust is not subject to earthbound erosive forces like wind, which, over time, smooths the surfaces of dust particles. Lunar dust is jagged, sharp-edged, and extremely fine, and it does not pack down like it would in earth's gravity. And due to radiation, lunar dust is electrostatically charged. The charged dust can be seen floating above the moon's surface, a phenomenon known as Dusty Plasma.

Lunar dust particles attach readily to space suits, causing damage to suit material. Sub-micrometer and micrometer-sized particles invade seals, joints, and space-suit fabrics, and can remain airborne in a human habitat, causing respiration hazards. Challenges presented by lunar dust include damage from abrasion, the effects of dust's electrostatic charge on the suit system, and dust intrusion to the suit system.

Because astronauts breathe through the ventilation system in their space suits, lunar dust entering a space suit can be dangerous. Lunar dust accumulating on spacesuits is an additional problem. NASA has appealed to the scientific public to help mitigate these problems through innovations that filter lunar dust from an astronaut's breathing environment, as well as innovations that protect mating and venting of connectors and suit components by use of specialized dust covers.

The Exploration Extravehicular Mobility Unit (xEMU) is a NASA-developed personal spaceship worn by an astronaut during lunar exploration. The xEMU holds life-support systems that protect astronauts from the harsh environment of space, enclosing them in a sealed, Earth-like atmosphere. The xEMU prevents inhalation of dust or contamination of the suit's life-support system.

NASA identified particular venting components on the xEMU that must be protected from lunar dust: the Spacesuit Purge Valve (SPV); the Low-Flow Purge Valve (LFPV); the Positive-Pressure Relief Valve (PPRV) and the Rapid-Cycle Amine (RCA) bed, all of which flow outward; the Negative-Pressure Relief Valve (NPRV) which flows inward; and battery vents, which flow in both directions as the batteries ventilate. One skilled in the art understands that an RCA bed is also referred to as a pressure swing bed. These valves are sensitive to any added flow resistance during venting, so an innovation that changes air resistance as it expels or prohibits the entrance of lunar dust must accommodate this.

The SPV and the LFPV are operable by crew members during extravehicular activities (EVA).

A tortuous path is defined as a path having at least one twist, bend, or turn. A tortuous path may be defined proximate a pipe (or other type of flow conduit) of a flow control device. For example, a tortuous path can be provided about the inner or outer surface of a vent or conduit.

One skilled in the art understands that dust in various earthly and other planetary environments may be problematic in valves and the like. A valve cover designed for lunar dust may be applicable to Martian dust, for example. This application refers to lunar dust for the purpose of clarity.

SUMMARY

A dust-mitigation device used in space exploration is a system for protecting the venting components of certain environments from the entry of lunar dust. The system enables ventilation while preventing dust from reaching sealing surfaces of a spacesuit's valves (SPVs) such as the Positive Pressure Relief Valve (PPRV) and the Low-Flow Purge Valve (LFPV). One iteration is designed for Exploration Extravehicular Mobility Unit (xEMU); another iteration is designed for the protection of the Negative Pressure Relief Valve (NPRV).

A combination of elements protects xEMU components from dust particles. To protect the LFPV, PPRV and NPRV components, vented purge-gas flows past a membrane valve (check valve), through a tortuous flow path, diverting most of the residual dust out of the dust covers. In some embodiments a fine screen filters lunar dust to protect the valves as cabin air flows into the spacesuit. In some embodiments a fine screen is a 35-micron screen.

In operation of the Rapid Cycle Amine Diverter Valve, gas flows out to space vacuum. The vacuum is used to exhaust collected CO2 from the RCA which employs a swing bed. One bed collects CO2 as spacesuit air passes through; the other vents, are pressure swing beds that collect CO2 to the vacuum of space. In order to reduce ullage remaining in the bed system it is important to reduce resistance presented to the exiting gas flow. To achieve this goal, in place of a check valve, Samarium Cobalt magnets are used to attract lunar dust.

In some embodiments a tortuous flow path begins in a direction that is substantially parallel to a vent cover central axis and is turned about the tortuous flow path until the direction of flow is substantially perpendicular to the vent cover central axis. This turning of the flow path mitigates a trajectory caused by flow that is substantially parallel to a vent cover central axis.

DETAILED DESCRIPTION

Figure 1:
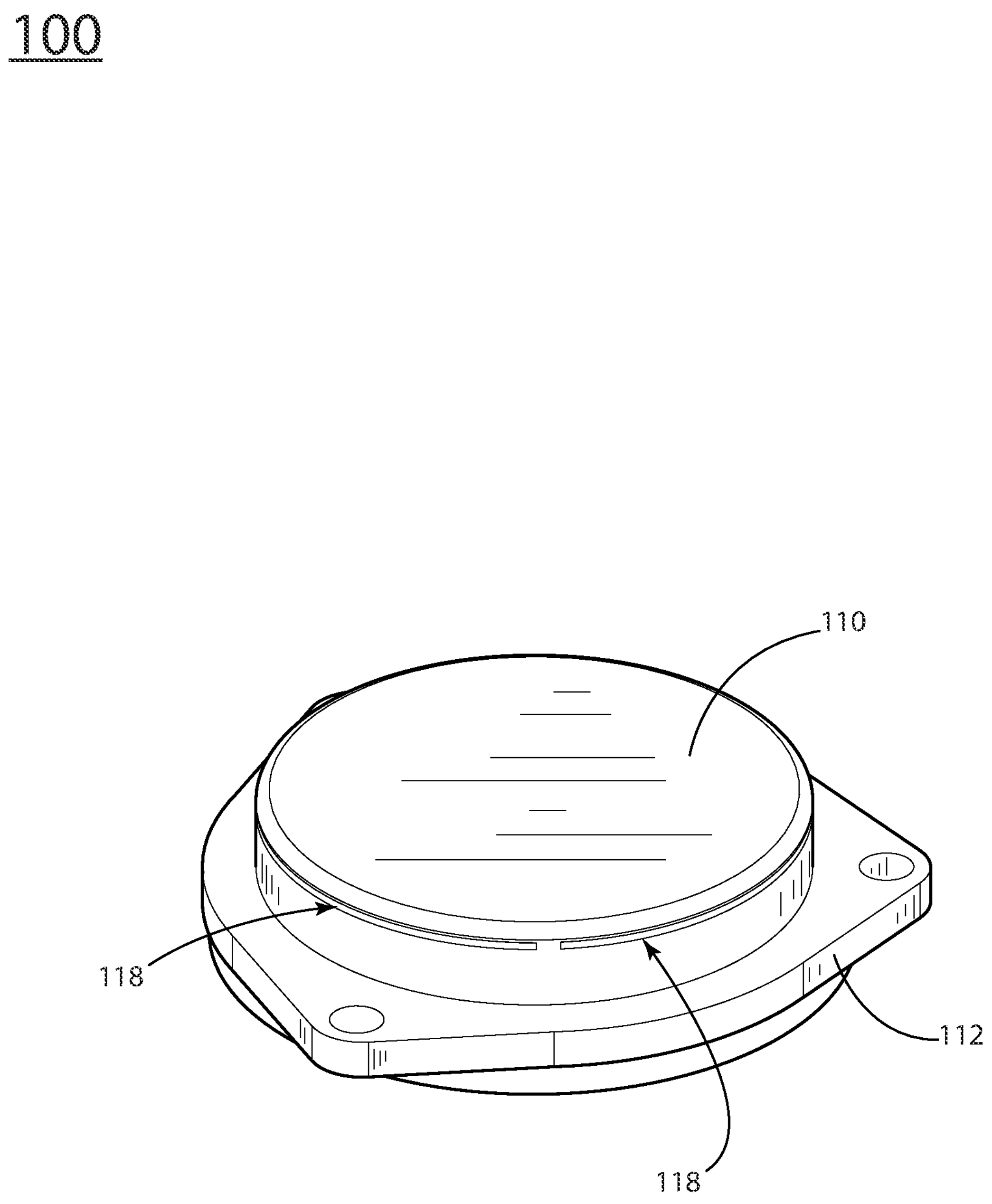
FIG. 1 is a perspective view of a first iteration of an example embodiment.
Figure 2:
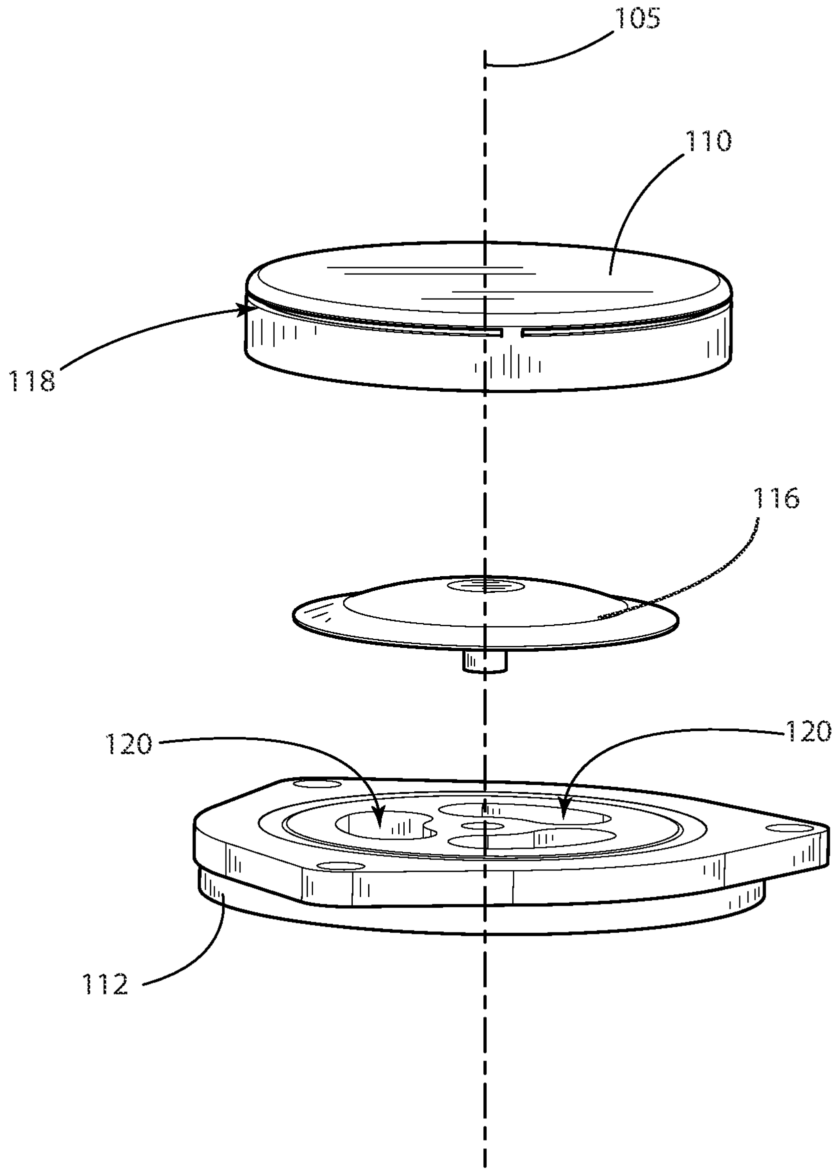
FIG. 2 is an exploded view thereof.
Figure 3:
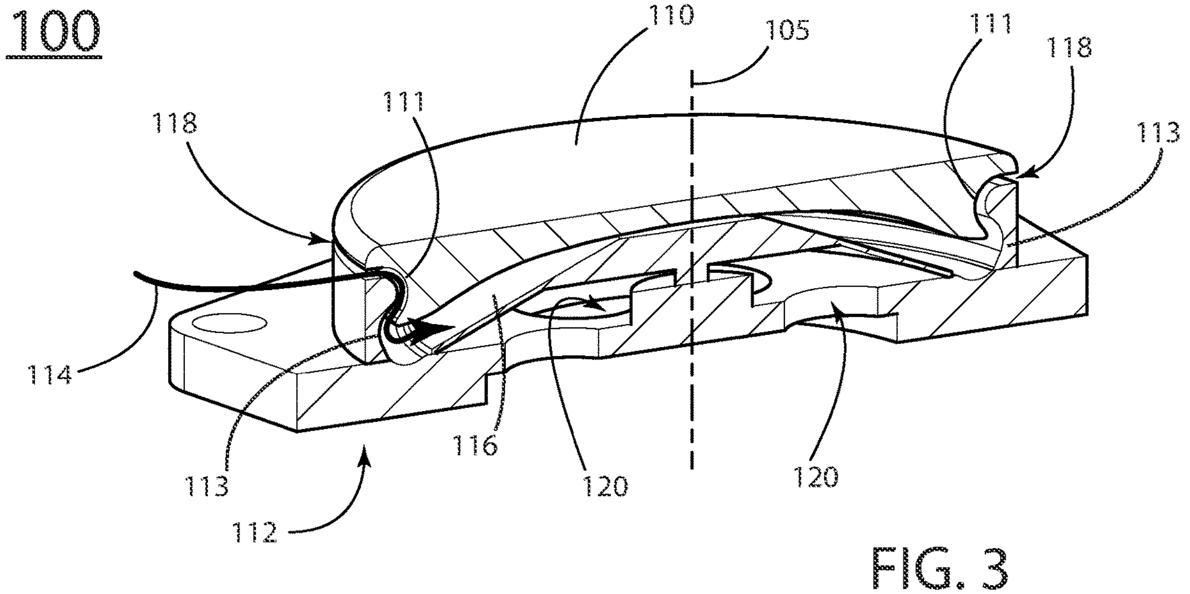
FIG. 3 is a perspective cutaway view thereof.

FIG. 1, FIG. 2, FIG. 3 and FIG. 4 show an example embodiment of a dust-mitigation vent cover with a tortuous flow path 114 that prevents dust from entering a human environment. A cap 110 is affixed to a base 112. A membrane (also referred to as a check valve) 116 is housed between the cap 110 and the base 112. The cap 110, check valve 116 and base 112 are coaxial with a central axis 105. A tortuous flow path 114 prohibits dust particle translation through a passage 120 in the base 112, through a check valve 116, through a first annular curved surface 113, through a second annular curved surface 111 and out an annular opening 118. The first annular curved surface 113 is formed in the base 112. The second annular curved surface 111 is tangent with the first annular curved surface 113 and is formed by an annular curved surface in both the base 112 and cap 110. Together, the first annular curved surface 113 and second annular curved surface 111 form a tortuous flow path 114. The flow path 114 may be said to begin in a direction that is substantially parallel to the central axis 105 and result in a direction that may be said to be substantially perpendicular to the central axis 105.

Figure 4:
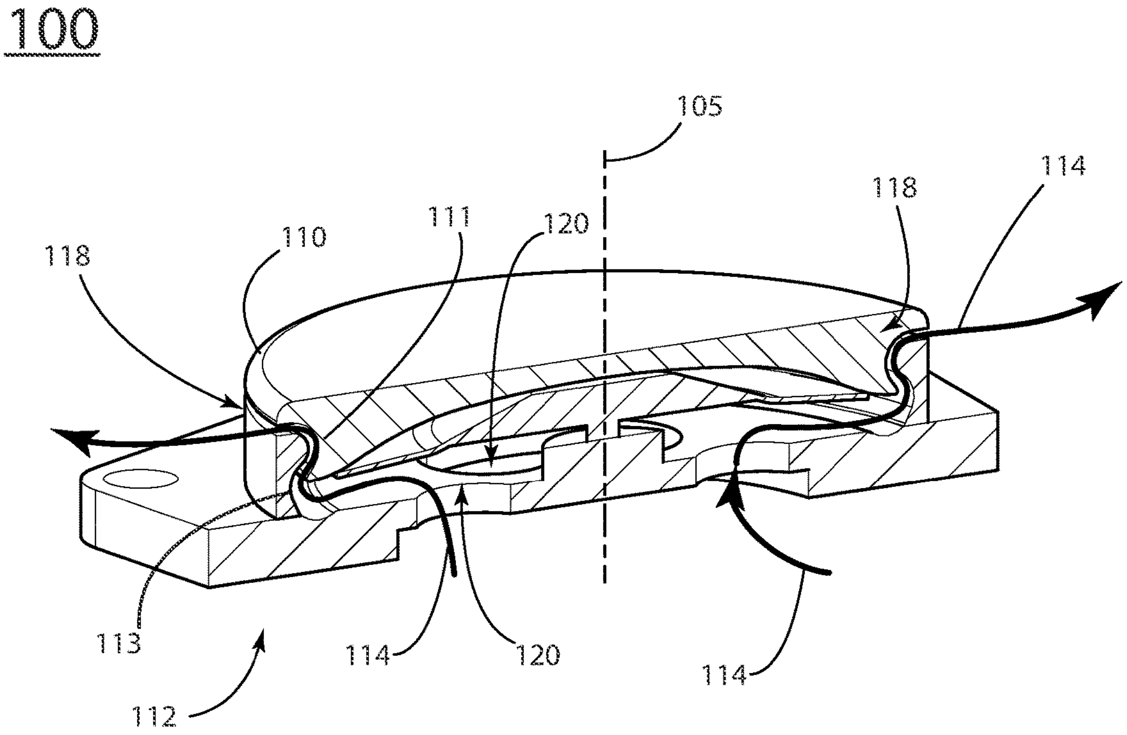
FIG. 4 is a perspective cutaway view thereof.
Figure 5:
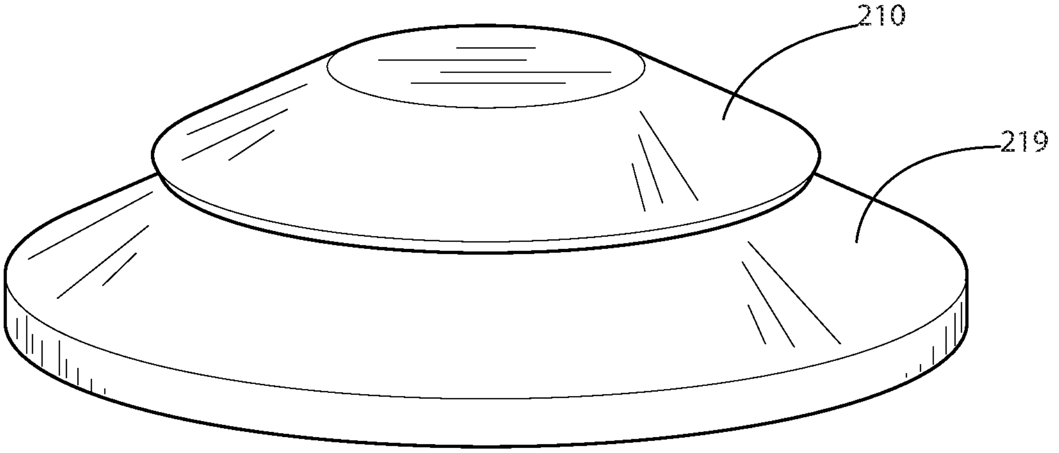
FIG. 5 is a perspective view of a second iteration of an example embodiment.
Figure 6:
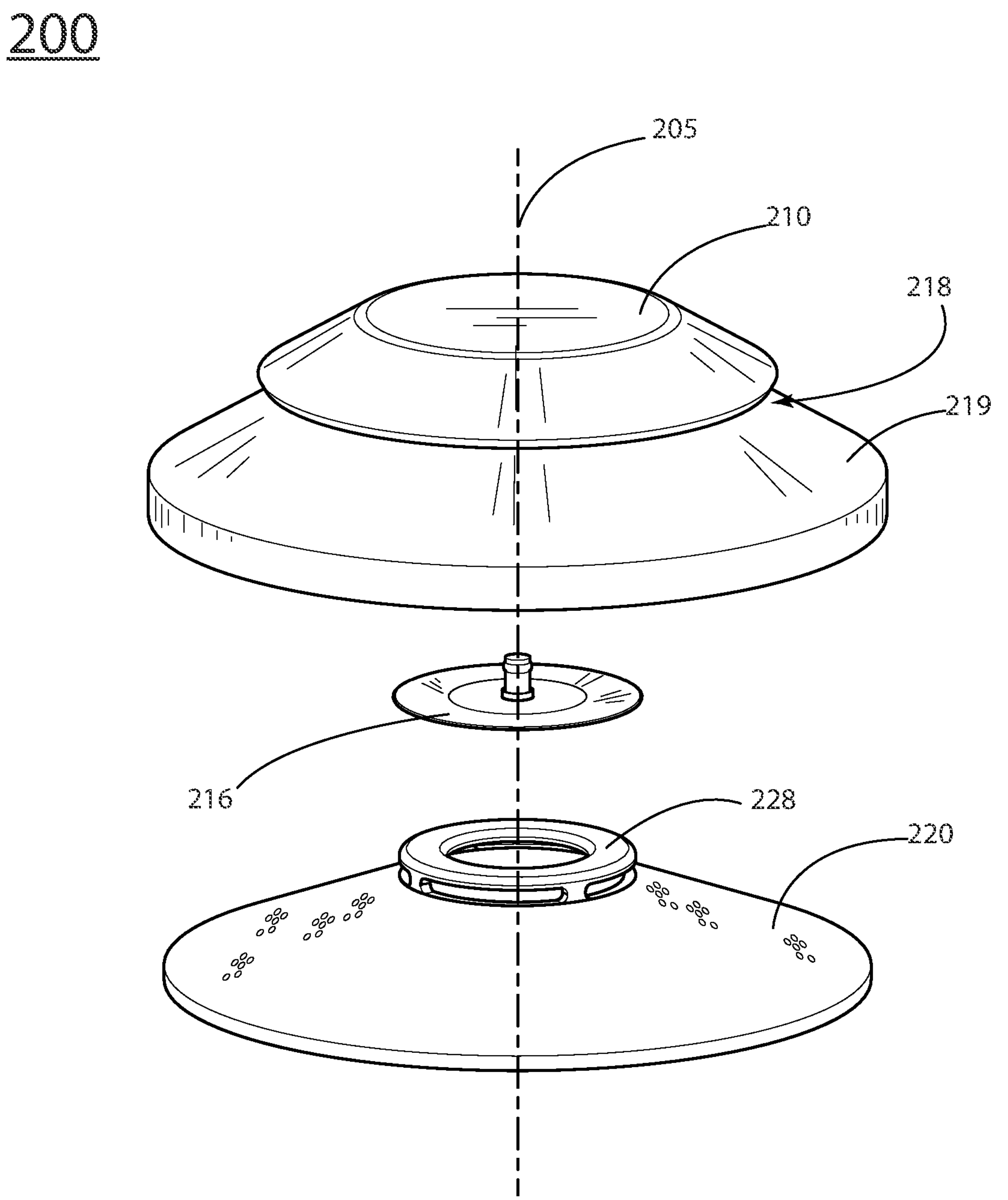
FIG. 6 is an exploded view thereof.

The check valve 116 prevents inflow (FIG. 3) and allows outflow (FIG. 4). One skilled in the art understands that a higher pressure in the interior environment opens the check valve 116 to allow outflow, and that a higher pressure in the exterior environment will keep the check valve closed. The check valve 116 may be said to have an umbrella shape or a domed shape as it is pressed against the cap 110.

A second iteration of the embodiment is depicted in FIG. 5, FIG. 6, FIG. 7 and FIG. 8. As they enter the Lunar Lander after a spacewalk, astronauts stop in an airlock to remove their spacesuits. If, due to a system failure, spacesuit pressure dips below an acceptable range, the NPRV automatically opens to allow air into the space suit to equalize the pressure. As this happens, gas flowing rapidly into the suit may pull lunar dust with it. A screen is designed to keep toxic lunar dust from entering the small air volume of a spacesuit. In some embodiments the screen is a 35-micron screen. Air approaches this screen through a tortuous flow path in the negative-pressure relief valve shown in FIGS. 5-8.

Figure 7:
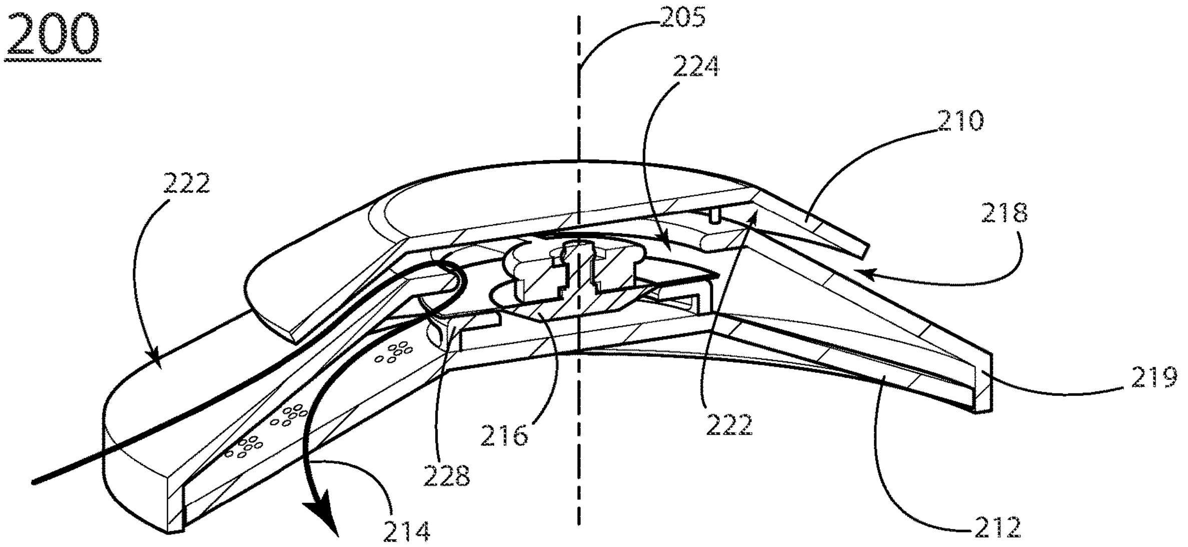
FIG. 7 is a perspective cutaway view thereof.
Figure 8:
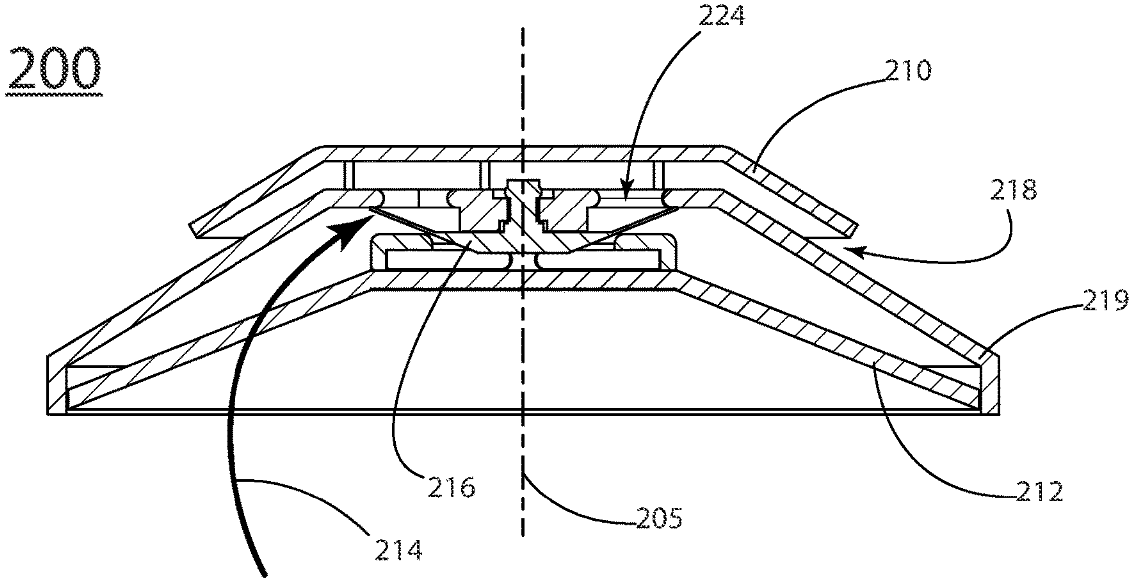
FIG. 8 is a perspective cutaway view thereof.

A cap 210 above a base 219 is affixed to a screen, which in some embodiments is a screen of approximately 35 microns 212. A check valve 216 moves within the cap 210 to seal against the base 219. The cap 210, base 219, check valve 216 and screen 212 are coaxial with a central axis 205. The cap 210 is a portion of a frusto-conical surface, also referred to as a frusto-conical surface portion, that influences the direction of flow. The base 219 is a portion of a conical surface that is offset from the frusto-conical surface portion that makes up the cap 210. One skilled in the art understands that an offset surface is substantially parallel to another surface. A tortuous flow path 214 winds from the ambient environment over an upper surface 222 of the base 219, under a surface 226 of the cap 210, through an opening 224, through a check valve 216 and through the screen 212. The check valve 216 prevents any inflowing dust through the tortuous path from reaching the screen 212 (FIG. 8) and allows inward flow (FIG. 7). A housing 228 prohibits the check valve 216 from deflecting excessively. One skilled in the art understands that surface 222 and surface 226 are annular surfaces forming an annular flow path 214. The flow path 214 is shown as a single arrow for clarity. The flow path 214 may be said to begin in a direction that is substantially perpendicular to the central axis 205 and result in a direction that may be said to be substantially parallel to the central axis 205.

Figure 9:
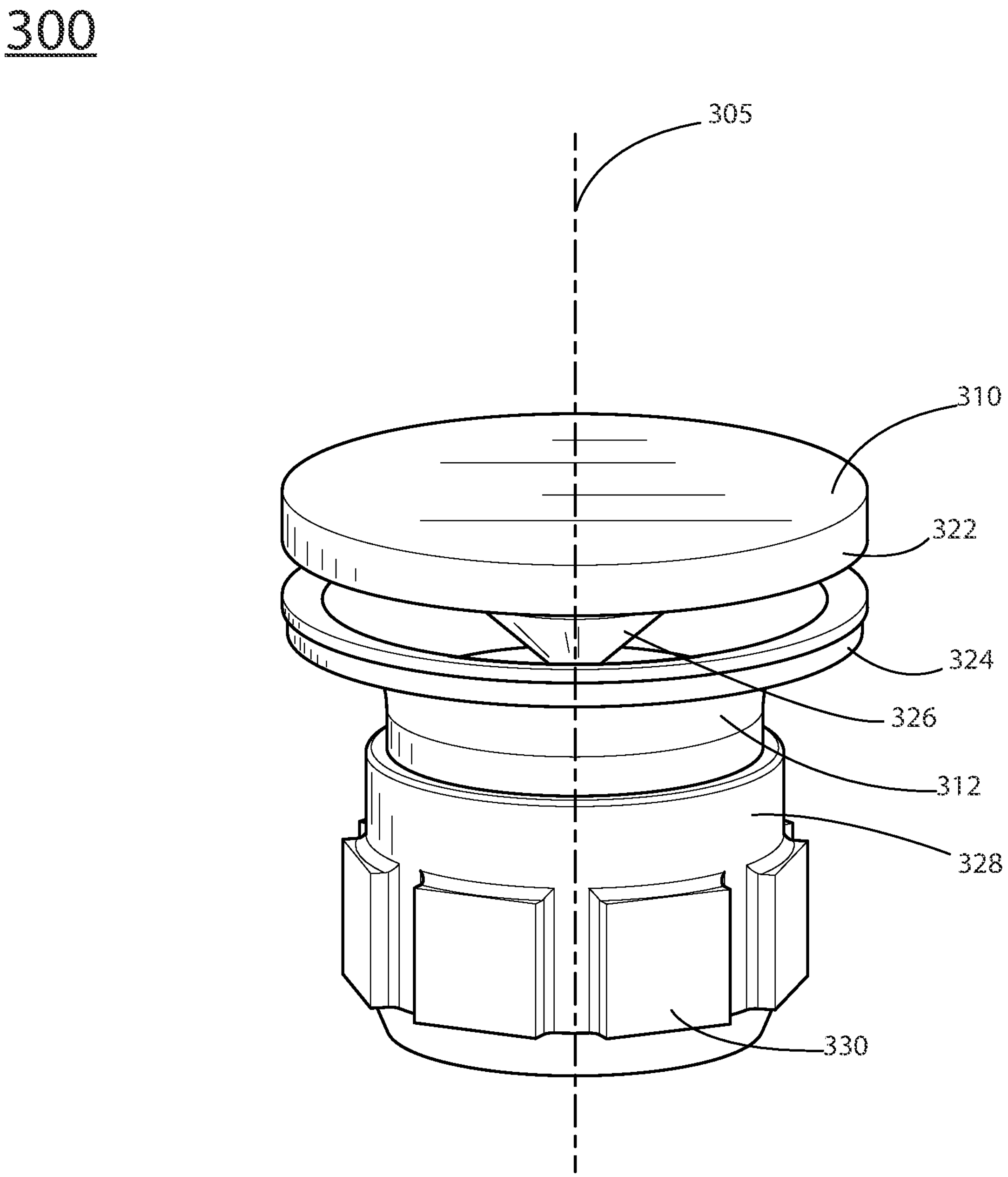
FIG. 9 is a perspective view of a third iteration of an example embodiment.
Figure 10:
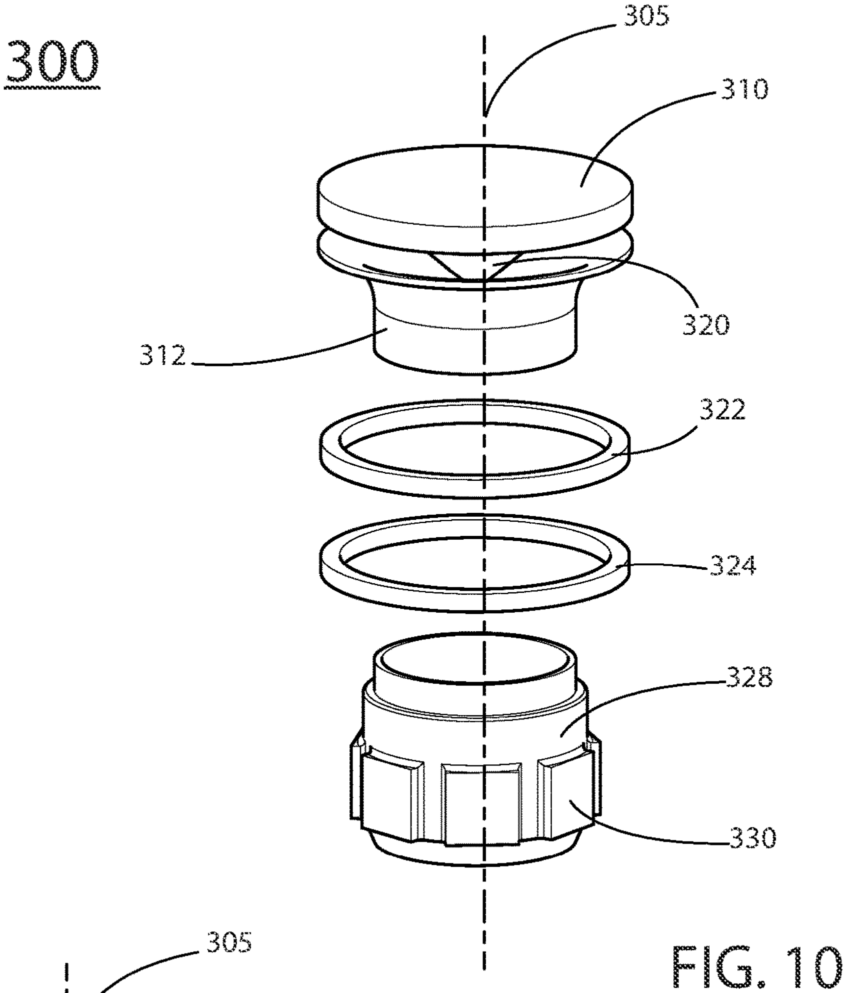
FIG. 10 is an exploded view thereof.
Figure 11:
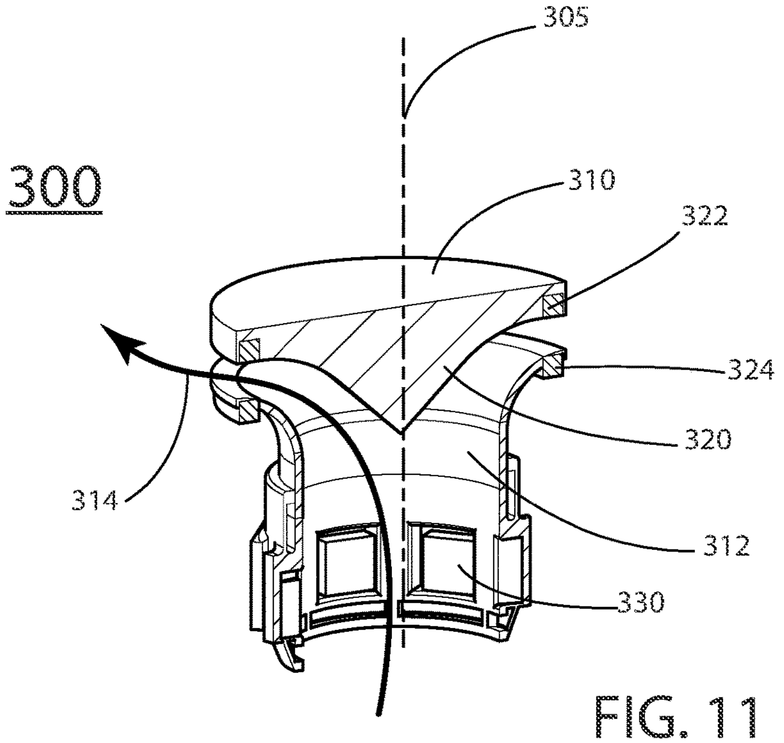
FIG. 11 is a perspective cutaway view thereof.

A third iteration of the embodiment, depicted in FIG. 9, FIG. 10 and FIG. 11, is designed to capture particles before reaching the RCA Diverter Valve during spacewalks.

An array of magnets 330 in the housing 328 provides a primary dust-mitigation device. Magnets 322 and 324 are a secondary dust mitigation device. One skilled in the art understands that the primary device and secondary device may either, or both, be included depending on which particle-cleaning method is chosen.

A conduit 312 is flared at an end. A cap 310 has a frusto-conical portion 320 that extends into the conduit 312 and both cap 310 and conduit 312 are coaxial about a central axis 305. A first annular magnet 324 is affixed proximal to the exit of the conduit 312. A second annular magnet 322 is affixed proximal to the circumference of the end cap 310. A housing 328 is affixed to the conduit 312 and houses an array of magnets 330. A tortuous flow path 314 proceeds along a conduit in a direction that may be said to be substantially parallel to the central axis 305, past the array of magnets 330, where it is directed by the conical portion 320, through the flare in the conduit 312 and passed the first annular magnet 324 and the second annular magnet 322. The tortuous flow path may be said to turn approximately 90° to flow in a direction that is substantially perpendicular to the central axis 305. One skilled in the art understands that lunar dust, being partially ferrous, is magnetic. Dust moving against the flow 314 may be trapped by the first annular magnet 324, second annular magnet 322 or finally by the array of magnets 330.

This configuration includes a tortuous path element, but with a smaller flow-path area due to the reduced mass flow of the intended environment. It also includes an inward-flow resistance protective element. In combination, these elements allow batteries to normally vent outward, and on occasion vent inward. As gas travels towards the vacuum of space it is directed to a substantially 90° turn along flow path 314 in an equal and planar manner. One skilled in the art understands that the intent is to negate any thrust that the astronaut may feel during RCA venting. The design is intended to act as a non-thrust port while minimizing any flow resistance to the exiting gas, while presenting a tortuous path to dust particles.

The invention claimed is:

1. A valve cover for mitigating dust contamination comprising:

a cap fixedly engaged with a conduit about a central axis; and the cap having a frusto-conical portion extending into the conduit; and a first annular curved surface formed by a flared end of said conduit and a second annular curved surface in said cap that is offset from said first annular curved surface, forming a tortuous flow path between said cap and conduit; wherein fluid flow by said first annular surface and said second annular surface mitigates a flow of dust through said valve cover.

2. The valve cover for mitigating dust contamination of claim 1 further comprising:

a first annular magnet fixedly engaged with said conduit; wherein ferrous particulate adheres to said first annular magnet mitigating a flow of ferrous dust.

3. The valve cover for mitigating dust contamination of claim 2 further comprising:

a second annular magnet fixedly engaged with said cap; wherein ferrous particulate adheres to said first annular magnet and said second annular magnet, mitigating the flow of ferrous dust.

4. The valve cover for mitigating dust contamination of claim 2 further comprising:

an array of magnets fixedly engaged with said conduit; wherein ferrous particulate adheres to at least one magnet in said first array of magnets mitigating the flow of ferrous dust through said valve cover.

5. An apparatus for capturing particles, comprising:

a conduit having a central axis; and a housing affixed to the conduit; and a cap positioned relative to the conduit, the cap having a frusto-conical portion extending into the conduit; and an array of magnets disposed within the housing; and a tortuous flow path defined between the conduit and the cap, wherein the flow path is configured to direct a fluid past the array of magnets and subsequently turn approximately 90 degrees relative to the central axis.

6. The apparatus of claim 5 further comprising:

a first annular magnet affixed proximal to an exit of the conduit; and a second annular magnet affixed proximal to a circumference of the cap.

7. The apparatus of claim 6 wherein:

the tortuous flow path is further configured to direct the fluid past the first annular magnet and the second annular magnet.

8. The apparatus of claim 5 wherein:

the tortuous flow path comprises a first portion where fluid flows in a direction substantially parallel to the central axis and a second portion where fluid flows in a direction substantially perpendicular to the central axis.

* * * * *